(12) United States Patent
Aust et al.

(10) Patent No.: US 12,528,137 B2
(45) Date of Patent: Jan. 20, 2026

(54) ULTRASONIC WELDING SYSTEM AND METHOD FOR THE WELDING PROCESSING OF MATERIALS

(71) Applicant: Herrmann Ultraschalltechnik Gmbh & Co. KG, Karlsbad (DE)

(72) Inventors: Volker Aust, Birkenfeld (DE); Jens Meier, Karlsbad (DE); Ulf Riehm, Ettlingen (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 4 days.

(21) Appl. No.: 18/575,485

(22) PCT Filed: Jun. 27, 2022

(86) PCT No.: PCT/EP2022/067491
§ 371 (c)(1),
(2) Date: Dec. 29, 2023

(87) PCT Pub. No.: WO2023/274916
PCT Pub. Date: Jan. 5, 2023

(65) Prior Publication Data
US 2024/0307995 A1    Sep. 19, 2024

(30) Foreign Application Priority Data
Jul. 2, 2021 (DE) ...................... 10 2021 117 169.5

(51) Int. Cl.
*B23K 20/00* (2006.01)
*B23K 20/10* (2006.01)

(52) U.S. Cl.
CPC .................................. *B23K 20/106* (2013.01)

(58) Field of Classification Search
CPC ............................. B23K 20/10; B23K 11/002
See application file for complete search history.

(56) References Cited

U.S. PATENT DOCUMENTS

| 2,985,954 A | 5/1961 | Jones et al. |
| 3,234,641 A | 2/1966 | Schneider et al. |

(Continued)

FOREIGN PATENT DOCUMENTS

| CH | 362296 A | 7/1962 |
| DE | 1303331 A | 9/1961 |

(Continued)

OTHER PUBLICATIONS

Agnes Wittmann-Regis; International Bureau of the World Intellectual Property Organization, International Preliminary Report on Patentability, Dated: Jan. 1, 2024; PCT/EP2022/067491 (and English translation).

*Primary Examiner* — Erin B Saad
(74) *Attorney, Agent, or Firm* — PAUL & PAUL

(57) ABSTRACT

The present invention relates to an ultrasonic welding installation (1) with an ultrasonic oscillating unit which comprises a sonotrode (2) and a converter (3), wherein the sonotrode (2) and the converter (3) are arranged one after the other along a longitudinal axis, optionally with the interposition of an amplitude transformer, and the ultrasonic oscillating unit can be caused to resonate with an ultrasonic oscillation with a wavelength λ in the direction of the longitudinal axis, and with a counterpart tool (11), wherein the sonotrode (2) comprises a sealing surface (12; 13) and the longitudinal axis extends parallel to the sealing surface (12, 13) or forms an angle of less than 90° therewith, wherein the counterpart tool (11) comprises a counterpart tool sealing surface (16) which faces the sealing surface (12, 13) of the sonotrode (2) and the sonotrode (2) and the counterpart tool (11) being movable relative to each other in a processing direction perpendicular to the longitudinal axis, whereby the distance between the sealing surface (12, 13) of the sonotrode (2) and the counterpart tool sealing surface (16) can be adjusted. In order to specify an ultrasonic welding installation which at (Continued)

Figure 1:
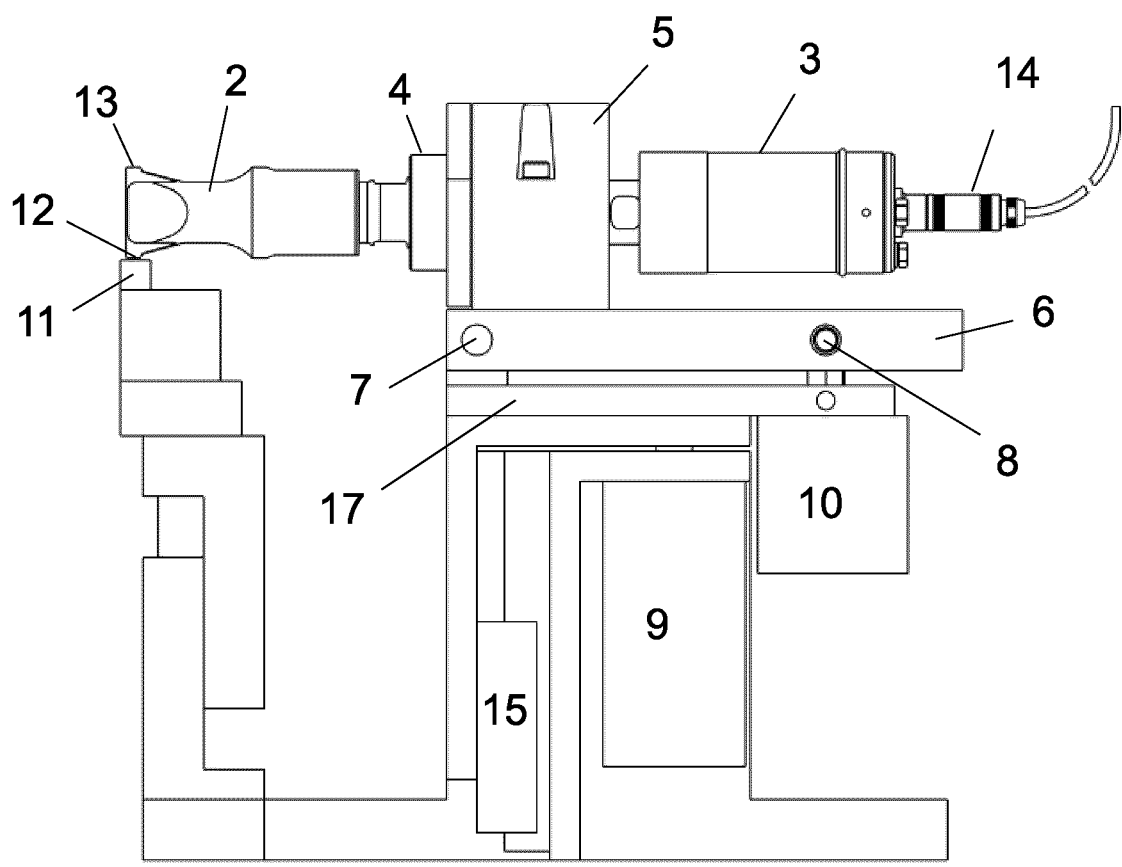
Figure 1:

least reduces the described disadvantages, it is proposed according to the invention that the ultrasonic oscillating unit or the counterpart tool is held by a rotary holder which can be rotated about a rotation axis which extends perpendicularly to the longitudinal axis, wherein the rotation axis is arranged in such a way that the distance between the sealing surface (12, 13) of the sonotrode (2) and the counterpart tool sealing surface (16) can be adjusted by rotating the rotary holder.

20 Claims, 4 Drawing Sheets

(56) References Cited

U.S. PATENT DOCUMENTS

| | | | |
|---|---|---|---|
| 3,917,146 | A | 11/1975 | Culp |
| 11,484,966 | B2 | 11/2022 | Mancini et al. |
| 2006/0208033 | A1 | 9/2006 | Welter |
| 2008/0308609 | A1 | 12/2008 | Felber |
| 2020/0001391 | A1* | 1/2020 | Sunaga ............... B23K 20/106 |
| 2021/0091038 | A1* | 3/2021 | Tanabe .................. H01L 21/50 |
| 2021/0154944 | A1* | 5/2021 | Ogaya ............... B29C 66/91231 |
| 2021/0154948 | A1 | 5/2021 | Mueller et al. |
| 2021/0272927 | A1* | 9/2021 | Aoyagi ............... B06B 1/0622 |
| 2024/0307995 | A1* | 9/2024 | Aust ..................... B23K 20/10 |

FOREIGN PATENT DOCUMENTS

| | | |
|---|---|---|
| DE | 102013208749 A1 | 5/2013 |
| DE | 102017215483 A1 | 4/2017 |
| WO | 2014184156 A1 | 11/2014 |
| WO | 2020126845 A1 | 6/2020 |

\* cited by examiner

ULTRASONIC WELDING SYSTEM AND METHOD FOR THE WELDING PROCESSING OF MATERIALS

CROSS-REFERENCE TO RELATED APPLICATIONS

This application is a national phase application of International Application PCT/EP2022/067491, filed Jun. 27, 2022, which claims the priority of German Patent Application 10 2021 117 169.5, filed Jul. 2, 2021, both of which are incorporated herein in their entireties by reference.

The present invention relates to an ultrasonic welding installation with an ultrasonic oscillating unit and a counterpart tool. The ultrasonic oscillating unit comprises a sonotrode and a converter, wherein the sonotrode and the converter are arranged one after the other along a longitudinal axis, optionally with an amplitude transformer interposed. The ultrasonic oscillating unit is designed in such a way that it can be caused to resonate with an ultrasonic oscillation in the direction of the longitudinal axis with a wavelength $\lambda$.

The sonotrode comprises a sealing surface arranged parallel to the longitudinal axis or forming an angle of less than 90° with the latter. The counterpart tool comprises a counterpart tool sealing surface arranged in such a way that the material to be processed can be arranged between the sealing surface of the sonotrode and the counterpart tool sealing surface for welding processing. The sonotrode and/or counterpart tool can be moved in a processing direction perpendicular to the longitudinal axis, whereby the distance between the sealing surface of the sonotrode and the counterpart tool sealing surface can be adjusted.

Such an ultrasonic welding installation is known from WO 2020/126845.

The sealing surface of the sonotrode and the counterpart tool sealing surface must be movable relative to each other. On the one hand, it is necessary to move the two sealing surfaces away from each other in order to position the material to be processed between the two sealing surfaces. On the other hand, during welding processing, i.e. when the sonotrode is set in ultrasonic vibration and comes into contact with the material to be processed with its sealing surface, it is necessary to exert a welding force on the material so that the two sealing surfaces are moved towards each other for this purpose.

For this purpose, a linear guide is provided in the prior art, which enables a linear movement of the two sealing surfaces towards and away from each other. The ultrasonic oscillating unit is held on a fixture, which in turn can be moved along the linear guide with the aid of a pneumatic cylinder.

To achieve an optimum welding result, it is becoming increasingly important to control the welding force, i.e. the force with which the sealing surface of the sonotrodes presses on the material to be processed, very precisely. In addition, very low welding forces are sufficient and necessary at times. However, this is very difficult to achieve with the aid of the aforementioned linear guide operated by a pneumatic cylinder. On the one hand, the friction in the guide and in the pneumatic cylinder has a negative effect. In addition, there is hysteresis within the pneumatic cylinder, which makes it difficult to achieve good reproducibility of the welding force. In addition, the pneumatic cylinders are relatively slow for small changes in welding force, which has a negative effect on the cycle time.

Based on the prior art described, it is therefore an object of the present invention to specify an ultrasonic welding installation which at least reduces the disadvantages described.

According to the invention, this object is solved in that the ultrasonic oscillating unit or the counterpart tool is held by a rotary holder which can be rotated about a rotation axis which extends perpendicularly to the longitudinal axis, wherein the rotation axis is arranged in such a way that the distance between the sealing surface of the sonotrode and the counterpart tool sealing surface can be adjusted by rotating the rotary holder.

In this context, the term "perpendicular to the longitudinal axis" is understood to mean any orientation of the rotation axis that lies within a plane oriented perpendicular to the longitudinal axis. It is therefore not necessary for the longitudinal axis and the rotation axis to intersect.

By moving away from the linear guide to adjust the welding force, a much finer adjustability of the welding force is provided.

In a preferred embodiment, the sealing surface of the sonotrode has a size of at least 0.25 cm$^2$, preferably of at least 0.5 cm$^2$ and most preferably of at least 1 cm$^2$.

In another preferred embodiment, the counterpart tool has a counterpart tool sealing surface that is shaped to correspond to the sealing surface of the sonotrode so that the distance between the sealing surfaces is constant during processing.

In a preferred embodiment, the ultrasonic oscillating unit or the counterpart tool is held by a linear mount which is connected to a linear guide by means of which the linear mount can be moved back and forth between two positions in the processing direction, wherein a first pneumatic drive is preferably provided for moving the linear mount between the two positions. Thus, the ultrasonic welding installation comprises both a rotary holder and a linear mount.

Using the linear guide, the sonotrode and counterpart tool can be moved away from each other so that the material to be processed can be positioned between the sealing surface of the sonotrode and the counterpart tool surface. Then the sonotrode and counterpart tool can be moved towards each other again with the aid of the linear guide. However, the welding force is adjusted by rotating the ultrasonic oscillating unit about the rotation axis. By this measure, most of the necessary movement can be provided by the linear mount, while the rotary holder is used only for providing and varying the welding force.

A pneumatic actuator may be provided to move the linear mount between the two positions, as is also known in the prior art.

In a preferred embodiment, either the sonotrode or the counterpart tool is held by both the rotary holder and the linear mount, wherein preferably the sonotrode is held by both the rotary holder and the linear mount. Thus, the function of the linear mount and the rotary holder can be realized by a single linear rotary holder, which can preferably move the sonotrode linearly relative to the counterpart tool and rotate it about the rotation axis.

A second pneumatic drive can be provided for moving the rotary holder about the rotation axis. This second pneumatic drive can engage a point on the rotary holder that is spaced from the rotation axis. The term "second pneumatic drive" is used here to distinguish this from the optional first pneumatic drive of the linear mount. Thus, embodiments with only a first pneumatic actuator, with only a second pneumatic actuator, and with both a first and a second pneumatic actuator are possible.

In a particularly preferred embodiment, the drive of the rotary holder, e.g. a pneumatic cylinder, engages at a point on the rotary holder that is further away from the rotation axis than the sonotrode sealing surface is away from the rotation axis. This allows very fine adjustment of the welding force.

A spring can also be provided for the movement of the rotary holder, the spring force of which is preferably adjustable. For example, a spiral spring or a gas spring can be used as the spring. In a preferred embodiment, the spring is preloaded in such a way that the rotary holder presses the sonotrode and counterpart tool against each other in the provided working position in which a material is to be processed between the sonotrode and counterpart tool. The spring thus applies a preferably adjustable welding force to the material.

In a further preferred embodiment, a control is provided which causes the ultrasonic oscillating unit or the counterpart tool to rotate about the rotation axis during the welding processing. As a result of the rotation about the rotation axis during processing, i.e. when both the sealing surface and the counterpart tool sealing surface are in contact with the material to be processed, the distance between the sealing surface and the counterpart tool sealing surface is thus reduced. Preferably, the control is configured in such a way that the distance between the sealing surface of the sonotrode and the counterpart tool sealing surface is adjusted solely by rotation about the rotation axis during the welding processing. Thus, there is no movement of the linear mount. In other words, movement of the linear mount is provided only for positioning the sealing surface relative to the counterpart tool sealing surface, while machining is then performed solely by rotation about the rotation axis.

In another preferred embodiment, the counterpart tool provides a receiving element which comprises the counterpart tool sealing surface, wherein the receiving element can be fixed to the counterpart tool in at least two receiving element positions.

Depending on the additional force exerted via the rotation axis or the angle through which the ultrasonic oscillating unit is rotated about the rotation axis, the point at which the sealing surface of the sonotrode contacts the counterpart tool sealing surface shifts. Therefore, in the preferred embodiment, the counterpart tool sealing surface can be attached to the counterpart tool in at least two positions.

In a preferred embodiment, the rotary holder comprises a rotary bearing or a solid-state joint that allows the ultrasonic oscillating unit to rotate about the rotation axis. In a preferred embodiment, the rotation axis does not intersect the longitudinal axis.

Furthermore, the present invention relates to a method for welding processing of materials, such as metallic braids or metal foils. According to the invention, a method that overcomes the abovementioned disadvantages is realized by using an ultrasonic welding installation as just described. Herein, the material to be processed is arranged between the sealing surface of the sonotrode on the one hand and the counterpart tool sealing surface on the other hand. By moving the sealing surface of the sonotrode in the direction of the counterpart tool sealing surface by means of the rotary holder, a welding force can then be applied to the material to be processed. If the ultrasonic oscillating unit is vibrated at the same time, an ultrasonic vibration can be introduced into the material, thereby causing welding.

In a preferred embodiment, therefore, the ultrasonic oscillating unit is first moved along the linear guide in such a way that the distance between the sealing surface of the sonotrode and the counterpart tool sealing surface is reduced, and then a rotation of the ultrasonic oscillating unit about the rotation axis is carried out, as a result of which the force required for welding processing is applied to the metallic material to be processed. The process is therefore used in particular for welding metal foils or metallic braids.

Figure 2:
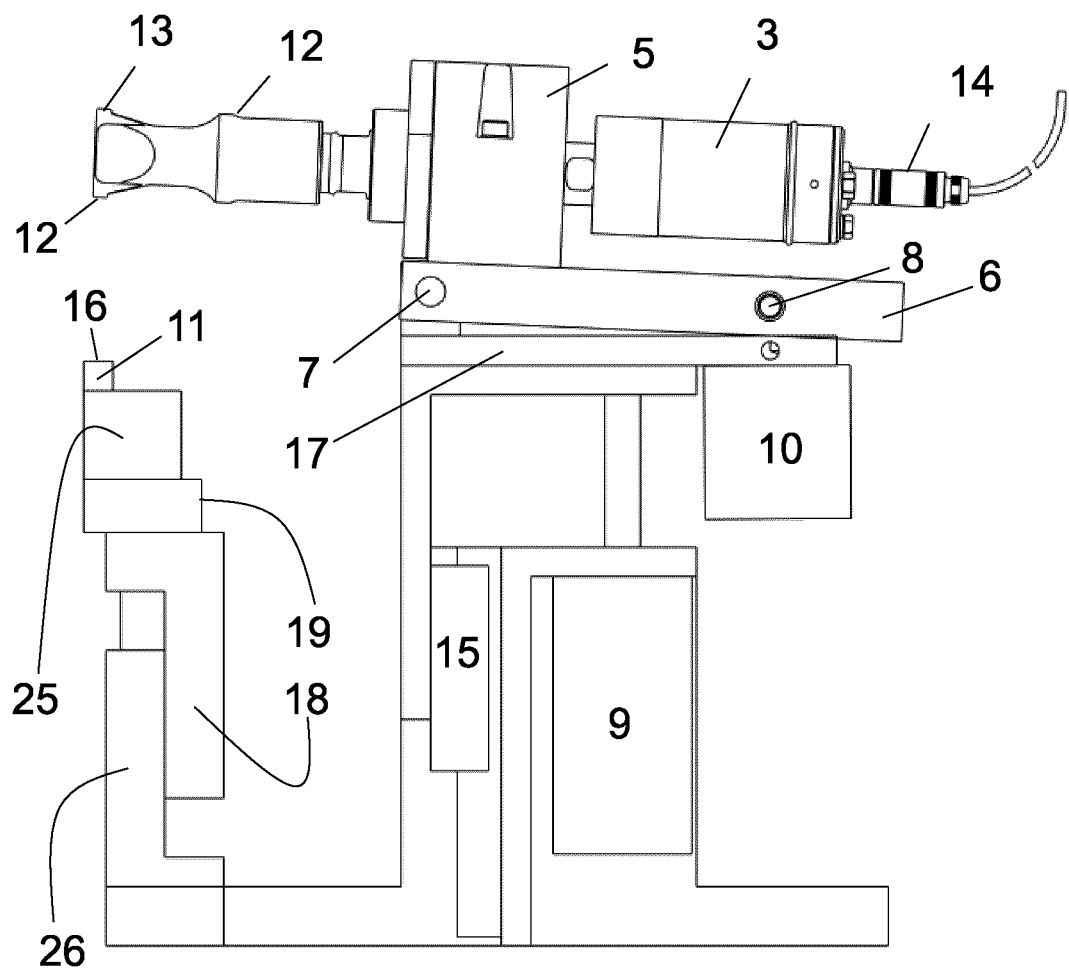
Figure 3:
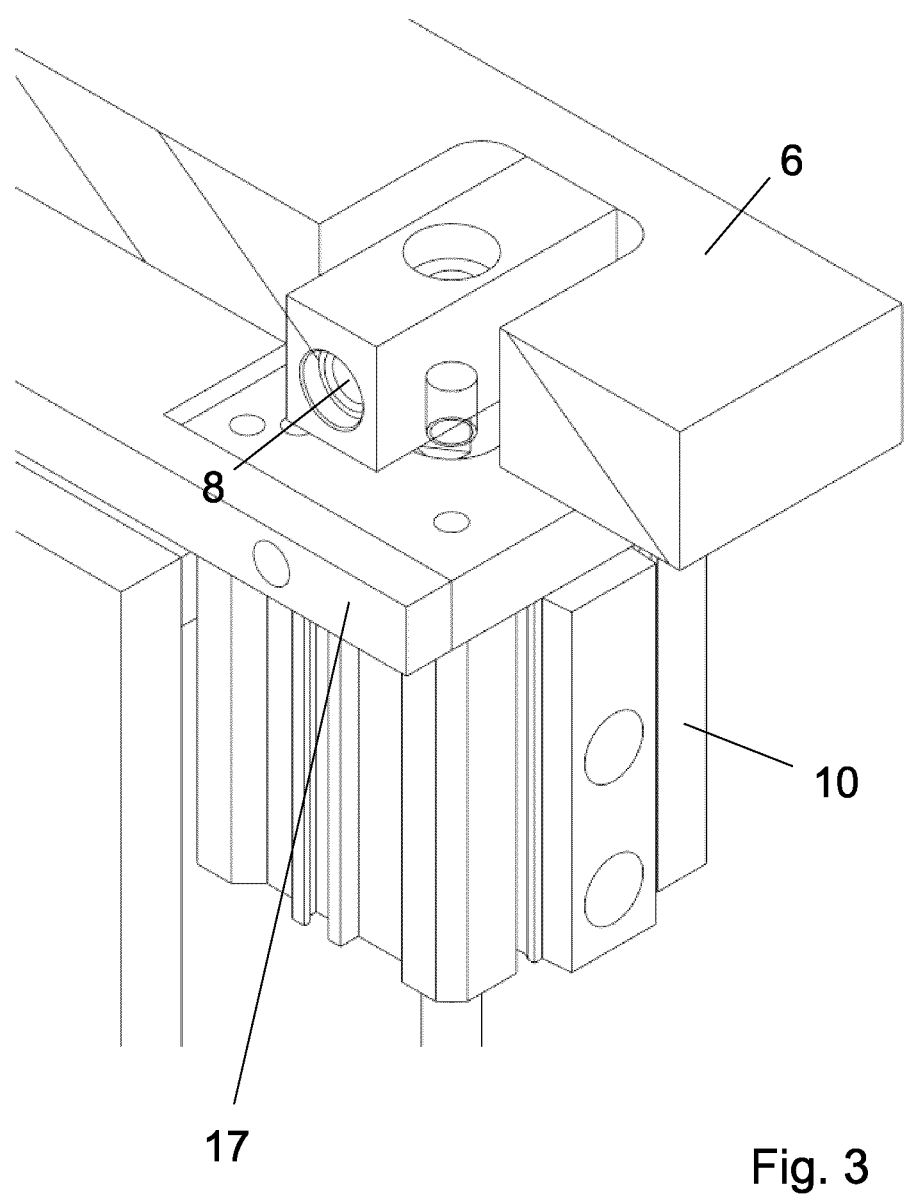
Figure 4:
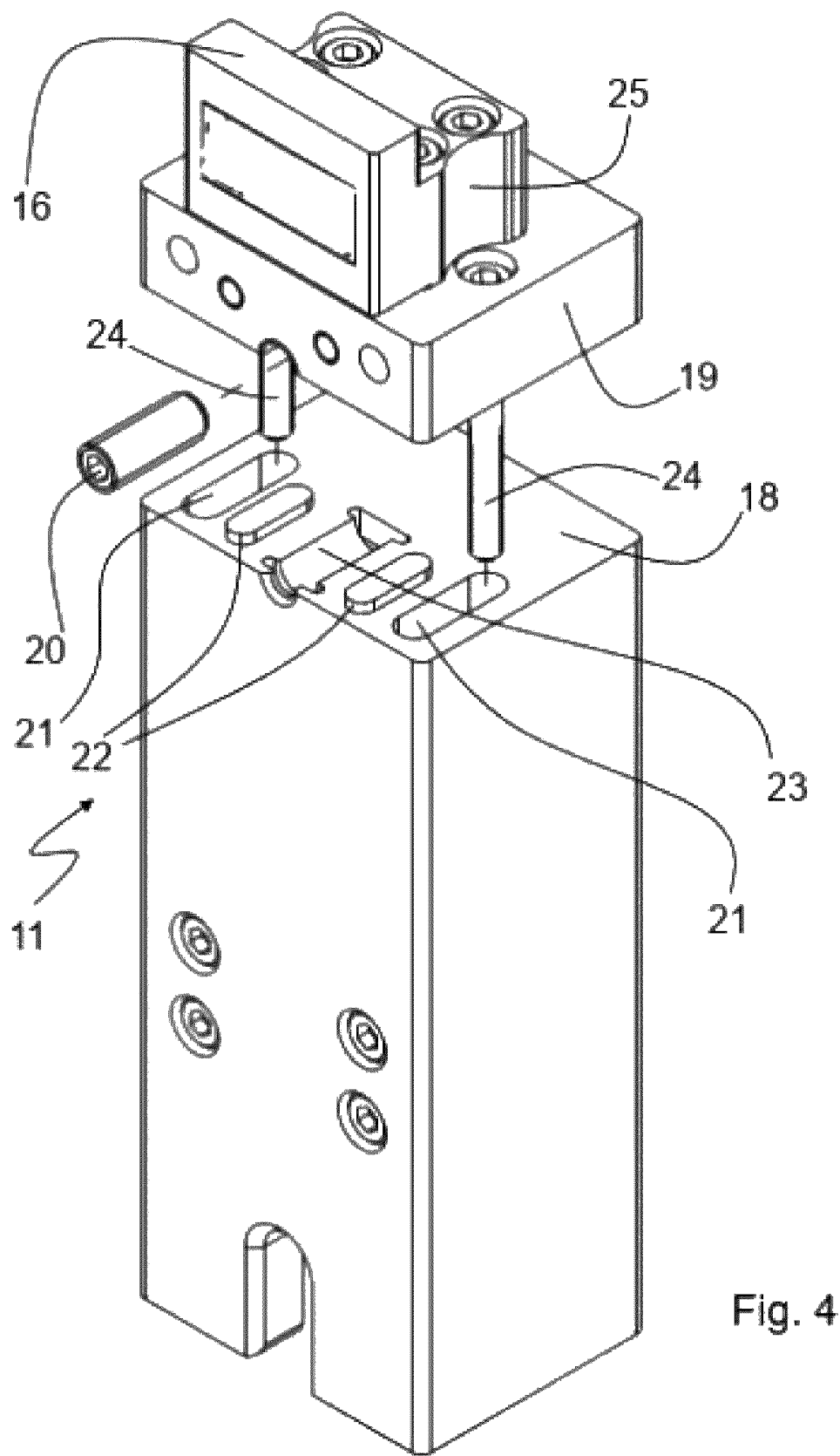

Further advantages, features and possible applications of the present invention will become clear from the following description of a preferred embodiment and the accompanying figures. It is shown in:

FIG. 1 a lateral plan view of an ultrasonic welding installation according to the invention in a working position, FIG. 2 a lateral plan view of the ultrasonic welding installation of FIG. 1 in a basic position, FIG. 3 a partially cut view through the drive for applying the welding force, and FIG. 4 an exploded view of the counter tool adjustment.

FIG. 1 shows a working position of an ultrasonic welding installation embodiment according to the invention. The ultrasonic welding installation 1 comprises an ultrasonic oscillating unit, which in the example shown consists of the sonotrode 2, a converter 3 and an amplitude transformer 4 arranged between the converter 3 and the sonotrode 2. The converter 3 receives a high-frequency electrical signal via the cable 14, which the converter converts into a mechanical longitudinal oscillation, the amplitude of which is transmitted to the sonotrode 2 in a modified form by the amplitude transformer 4. Converter 3, amplitude transformer 4 and sonotrode 2 are tuned to each other in such a way that at a certain wavelength the ultrasonic oscillating unit can be caused to oscillate resonantly.

The ultrasonic oscillating unit is held by a holding element 5 in the form of a sheath element, which in the example shown encloses the amplitude transformer in the form of a sheath. The holding element 5 is connected to the amplitude transformer 4 in such a way that the oscillation of the ultrasonic oscillating unit is influenced as little as possible. If no amplitude transformer is provided, the holding element can hold the converter 3, for example. The holding element 5 engages a vibration node of the standing wave that is shaped along the longitudinal axis. The longitudinal axis A extends horizontally in FIG. 1, so that the sonotrode 2, the amplitude transformer 4 and the converter 3 are arranged one after the other along the longitudinal axis.

The sonotrode 2 has a plurality of sealing surfaces 12, 13 at its end facing away from the amplitude transformer 4, wherein one sealing surface 12 faces the counterpart tool 11, while a further sealing surface 13 faces away from the counterpart tool 11. If the ultrasonic oscillating unit is used in the position shown, only the sealing surface 12 of the sonotrode 2 is used. If the sealing surface 12 becomes worn during processing, the sonotrode 2 can be rotated about its longitudinal axis, e.g. by 180°, when the holding element 5 is temporarily released, so that the further sealing surface 13 of the sonotrode then comes to lie opposite the counterpart tool 11. Only two sealing surfaces 12, 13 can be seen in the figures. However, the sonotrode 2 can also have more than two sealing surfaces. For example, if the sonotrode has four sealing surfaces, these can be used in succession if the sonotrode 2 is rotated 90° about its longitudinal axis in each case.

The embodiment shown is adapted for processing metals. The sealing surfaces 12, 13 are oriented parallel to the longitudinal axis. In particular, if no metallic materials are being processed, the sealing surface can also be arranged orthogonally to the longitudinal axis so that the end face of the sonotrode facing away from the converter acts as the sealing surface. In this case, the counterpart tool sealing surface should then also be arranged orthogonally to the longitudinal axis of the ultrasonic oscillating unit.

The holding element 5 is attached to a lever element 6, which is connected to a slide element 17 via a rotary bearing 7. The slide element 17 can be moved back and forth between two positions via a linear guide 15 in the vertical direction, i.e. perpendicular to the longitudinal axis. To accomplish this, the pneumatic cylinder 9 is provided. When the pneumatic cylinder 9 is actuated, the slide element 17 is moved upwards. Such a position is shown in FIG. 2. The lever element 6 has a rotary bearing 8 remote from the rotation axis 7, which can be pulled downward in the vertical direction via the second pneumatic cylinder 10, so that the lever element 6, including the ultrasonic oscillating unit attached to it, rotates clockwise about the rotation axis 7.

In FIG. 2, a basic position is shown in which both the pneumatic cylinder 9 has moved the slide element 17 to its upper position and the second pneumatic cylinder 10 has moved the rotary bearing 8 to its lower position, resulting in a tilting of the ultrasonic system about the rotation axis 7.

In the position shown in FIG. 2, the material to be processed, which is preferably a metallic material, can be positioned between the sealing surface 12 of the sonotrode and the counterpart tool sealing surface 16.

If processing is now started, the carriage element 17 is first moved downward over the linear guide 15 with the aid of the first pneumatic cylinder 9, which reduces the distance between the sealing surface 12 of the sonotrode 2 and the counterpart tool sealing surface 16. During this time, the ultrasonic oscillating unit may already be excited with an ultrasonic oscillation. However, this can also be done at a later time immediately before the welding processing.

For the welding processing, only the second pneumatic cylinder 10 is now required, which rotates the rotary bearing 8 and thus the lever element 6 counterclockwise about the rotation axis 7 and thus exerts a welding force via the sealing surface 12 of the sonotrode 2 on the material to be processed.

For clarification, a partially cut detail view of the rotary bearing 8 in the lever element 6 is shown in FIG. 3. The second pneumatic cylinder 10 is connected to the carriage 17. By moving the piston, which is connected to the rotary bearing 8, the rotary bearing 8 can be moved in the direction of the carriage 17 or moved away from it. Since the rotary bearing is rotatably connected to the lever element 6, this allows the lever element 6 to be rotated a few degrees clockwise or counterclockwise about the axis 7, which also rotates the sealing surface 12 of the sonotrode 2 about the rotation axis 7.

FIG. 4 shows an exploded view of the counterpart tool 11. The counterpart tool 11 comprises a lower counterpart tool support 26, an upper counterpart tool support 18 and a receiving element 19 which can be attached thereto and which comprises the sealing surface member 25 with the counterpart tool sealing surface 16. The upper counterpart tool support 18 can be adjusted in height relative to the lower counterpart tool support 26 to roughly adjust the distance between the counterpart tool 11 and the sonotrode 2. The upper counterpart tool support 18 comprises recessed grooves 21 as well as protruding groove stones 22. The receiving element 19 can thus be placed on the counterpart tool support 18 in such a way that the groove stones 22 of the upper counterpart tool support 18 come to lie in the corresponding grooves of the receiving element 19. In this position, the receiving element 19 can be displaced relative to the upper counter-tool carrier 18 along the alignment of the grooves. This displacement is effected with the aid of the threaded rod 20, which comes to rest in the groove 23 and is supported there on the base of the groove. By turning the threaded rod 20, the receiving element 19 can be displaced in the direction of the grooves 21 relative to the upper counterpart tool support 18. The receiving element 19 can be fastened to the upper counterpart tool support by means of fastening screws 24.

The receiving element 19 comprises a sealing surface member 25, which comprises the counterpart tool sealing surface 16. Therefore, by rotating the threaded rod 20, the counterpart tool sealing surface 16 can be moved.

REFERENCE NUMBERS

1 Ultrasonic welding installation
2 Sonotrode
3 Converter
4 Amplitude transformer
5 Holding element
6 Lever element
7, 8 Rotary bearing
9 First pneumatic cylinder
10 Second pneumatic cylinder
11 Counterpart tool
12, 13 Sealing surface
14 Cable
15 Linear guide
16 Counterpart tool sealing surface
17 Slide element
18 Upper counterpart tool support
19 Receiving element
20 Threaded rod
21 Recessed grooves
22 Protruding groove stones
23 Groove
24 Fastening screws
25 Sealing surface member
26 Lower counterpart tool support

The invention claimed is:

1. An ultrasonic welding installation (1) with an ultrasonic oscillating unit which comprises a sonotrode (2) and a converter (3),
   wherein the sonotrode (2) and the converter (3) are arranged one after the other along a longitudinal axis, and
   the ultrasonic oscillating unit can be caused to resonate with an ultrasonic oscillation with a wavelength $\lambda$ in the direction of the longitudinal axis, and
   with a counterpart tool (11),
   wherein the sonotrode (2) comprises a sealing surface (12; 13) and the longitudinal axis extends parallel to the sealing surface (12, 13) or forms an angle of less than 90° with the sealing surface (12, 13)
   wherein the counterpart tool (11) comprises a counterpart tool sealing surface (16) which faces the sealing surface (12, 13) of the sonotrode (2), and
   the sonotrode (2) and the counterpart tool (11) are movable relative to one another in a processing direction perpendicular to the longitudinal axis,
   whereby the distance between the sealing surface (12, 13) of the sonotrode (2) and the counterpart tool sealing surface (16) can be adjusted,
   wherein the ultrasonic oscillating unit or the counterpart tool is held by a rotary holder which can be rotated about a rotation axis extending perpendicularly to the longitudinal axis, wherein the rotation axis is arranged in such a way that the distance between the sealing surface (12, 13) of the sonotrode (2) and the counterpart tool sealing surface (16) can be adjusted by rotating the rotary holder, characterized in that the ultrasonic oscillating unit or the counterpart tool is held by a linear mount which is connected to a linear guide by means of which the linear mount can be moved back and forth in the processing direction between two positions, wherein either the sonotrode or the counterpart tool is held by both the rotary holder and the linear mount.

2. The ultrasonic welding installation (1) according to claim 1, characterized in that a first pneumatic drive is provided for moving the linear mount between the two positions.

3. The ultrasonic welding installation (1) according to claim 1, characterized in that the sonotrode is held by both the rotary holder and the linear mount.

4. The ultrasonic welding installation (1) according to claim 2, characterized in that a second pneumatic drive is provided for rotating the ultrasonic oscillating unit about the rotation axis.

5. The ultrasonic welding installation according to claim 1, characterized in that a control is provided which, during the welding processing, causes the ultrasonic oscillating unit or the counterpart tool to rotate about the rotation axis.

6. The ultrasonic welding installation (1) according to claim 1, characterized in that the counterpart tool (11) provides a receiving element (19) which comprises the counterpart tool sealing surface (16), wherein the receiving element (19) can be fixed to the counterpart tool (11) in at least two receiving element positions.

7. The ultrasonic welding installation (1) according to claim 1, characterized in that the rotary holder comprises a rotary bearing or a solid-state joint which enables the ultrasonic oscillating unit to be rotated about the rotation axis.

8. A method for welding processing of materials, such as metallic braids or metal foils, characterized in that an ultrasonic welding installation (1) according to claim 1 is used, the method comprising (a) positioning a material to be processed between the sealing surface of the sonotrode and the counterpart tool sealing surface and (b) exciting the ultrasonic oscillating unit with an ultrasonic vibration.

9. The method according to claim 8, characterized in that for applying a welding force to a metallic material arranged between the sealing surface (12, 13) of the sonotrode (2) and the counterpart tool sealing surface (16), the ultrasonic oscillating unit is rotated about its rotation axis.

10. The method according to claim 9, characterized in that first the ultrasonic oscillating unit is moved along the linear guide in such a way that the distance between the sealing surface (12, 13) of the sonotrode and the counterpart tool sealing surface (16) is reduced, and then, by rotating the ultrasonic oscillating unit about the rotation axis, the force necessary for the welding processing is applied to the metallic material to be processed.

11. The ultrasonic welding installation (1) according to claim 1, further comprising an amplitude transformer interposed between the sonotrode (2) and the converter (3).

12. The ultrasonic welding installation (1) according to claim 1, characterized in that the counterpart tool is held by both the rotary holder and the linear mount.

13. The ultrasonic welding installation (1) according to claim 4 wherein the second pneumatic drive engages a point of the first holder that is spaced from the rotation axis.

14. The ultrasonic welding installation according to claim 5, wherein the control is configured in such a way that, during the welding processing, the distance between the sealing surface (12, 13) of the sonotrode (2) and the counterpart tool sealing surface (16) is adjusted solely by the rotation about the rotation axis.

15. The ultrasonic welding installation according to claim 2, characterized in that a control is provided which, during the welding processing, causes the ultrasonic oscillating unit or the counterpart tool to rotate about the rotation axis, wherein the control is configured in such a way that, during the welding processing, the distance between the sealing surface (12, 13) of the sonotrode (2) and the counterpart tool sealing surface (16) is adjusted solely by the rotation about the rotation axis.

16. The ultrasonic welding installation according to claim 3, characterized in that a control is provided which, during the welding processing, causes the ultrasonic oscillating unit or the counterpart tool to rotate about the rotation axis, wherein the control is configured in such a way that, during the welding processing, the distance between the sealing surface (12, 13) of the sonotrode (2) and the counterpart tool sealing surface (16) is adjusted solely by the rotation about the rotation axis.

17. The ultrasonic welding installation (1) according to claim 2, characterized in that the counterpart tool (11) provides a receiving element (19) which comprises the counterpart tool sealing surface (16), wherein the receiving element (19) can be fixed to the counterpart tool (11) in at least two receiving element positions.

18. The ultrasonic welding installation (1) according to claim 3, characterized in that the counterpart tool (11) provides a receiving element (19) which comprises the counterpart tool sealing surface (16), wherein the receiving element (19) can be fixed to the counterpart tool (11) in at least two receiving element positions.

19. The ultrasonic welding installation (1) according to claim 2, characterized in that the rotary holder comprises a rotary bearing or a solid-state joint which enables the ultrasonic oscillating unit to be rotated about the rotation axis.

20. The ultrasonic welding installation (1) according to claim 3, characterized in that the rotary holder comprises a rotary bearing or a solid-state joint which enables the ultrasonic oscillating unit to be rotated about the rotation axis.

* * * * *